(12) United States Patent
Cusack et al.

(10) Patent No.: US 11,415,480 B2
(45) Date of Patent: Aug. 16, 2022

(54) SELF CHARGING FLUID FLOW SENSOR SYSTEM

(71) Applicant: FlowActive, Inc., Troy, NY (US)

(72) Inventors: Matthew Cusack, Troy, NY (US); Frank Lipowitz, Rexford, NY (US); Robert Paul Borthwick, Glenelg, MD (US)

(73) Assignee: FLOWACTIVE, INC., Troy, NY (US)

( * ) Notice: Subject to any disclaimer, the term of this patent is extended or adjusted under 35 U.S.C. 154(b) by 42 days.

(21) Appl. No.: 17/124,897

(22) Filed: Dec. 17, 2020

(65) Prior Publication Data

US 2021/0189705 A1 Jun. 24, 2021

Related U.S. Application Data

(60) Provisional application No. 62/951,511, filed on Dec. 20, 2019.

(51) Int. Cl.

| | | |
|---|---|---|
| *G01M 3/18* | (2006.01) | |
| *E03B 7/07* | (2006.01) | |
| *E03D 11/00* | (2006.01) | |
| *G01F 15/18* | (2006.01) | |
| *G01F 1/06* | (2006.01) | |
| *G01F 1/28* | (2006.01) | |
| *G01M 3/32* | (2006.01) | |

(52) U.S. Cl.
CPC ............... *G01M 3/18* (2013.01); *E03B 7/072* (2013.01); *E03D 11/00* (2013.01); *G01F 1/06* (2013.01); *G01F 1/28* (2013.01); *G01F 15/18* (2013.01); *G01M 3/182* (2013.01); *G01M 3/3254* (2013.01); *Y02A 20/15* (2018.01)

(58) Field of Classification Search
CPC ..... G01F 1/05; G01F 1/06; G01F 1/10; G01F 15/18
See application file for complete search history.

(56) References Cited

U.S. PATENT DOCUMENTS

| | | |
|---|---|---|
| 4,916,762 A | 4/1990 | Shaw |
| 5,327,931 A | 7/1994 | Royalty et al. |
| 5,419,189 A | 5/1995 | Lew et al. |
| 5,546,009 A | 8/1996 | Raphael |

(Continued)

FOREIGN PATENT DOCUMENTS

| | | | |
|---|---|---|---|
| JP | 10311073 A | * | 11/1998 |
| JP | 2012207501 A | * | 10/2012 |
| JP | 2015161127 A | * | 9/2015 |

OTHER PUBLICATIONS

Hatakeyama, JP 2012-207501 A, Oct. 2012, EPO Computer Translation (Year: 2012).*

*Primary Examiner* — Erika J. Villaluna
(74) *Attorney, Agent, or Firm* — Hoffman Warnick LLC (57) ABSTRACT

A self-charging sensor (SCS) adapted for use in a toilet or the like. The SCS includes a housing having a rechargeable battery; a turbine module having a multilevel impeller having offset wheels that are adapted to be driven by a fluid flow via an inlet port during an event, wherein a rotation of the impeller causes the turbine module to generate electricity that recharges the rechargeable battery; and a processing module that collects count data associated with the rotation during the event; and an attachment component adapted to seat the housing on an overflow tube.

18 Claims, 9 Drawing Sheets

(56) References Cited

U.S. PATENT DOCUMENTS

| | | |
|---|---|---|
| 6,802,084 B2 | 10/2004 | Ghertner et al. |
| 6,877,170 B1 | 4/2005 | Quintana et al. |
| 6,934,977 B1 | 8/2005 | Quintana et al. |
| 7,743,436 B1 | 6/2010 | Schuster et al. |
| 8,166,996 B2 | 5/2012 | Canfield et al. |
| 8,690,117 B2 * | 4/2014 | Dunn .................. G01F 1/0755 702/46 |
| 9,090,295 B2 | 7/2015 | Lagassey et al. |
| 2003/0145371 A1 | 8/2003 | Ghertner et al. |
| 2004/0199989 A1 | 10/2004 | Trolio |
| 2007/0125429 A1 | 6/2007 | Kandl |
| 2008/0141447 A1 | 6/2008 | Bowcutt et al. |
| 2010/0000013 A1 | 1/2010 | Williams |
| 2013/0124113 A1 | 5/2013 | van Dal |
| 2015/0059074 A1 | 3/2015 | Davies |
| 2015/0168188 A1 | 6/2015 | Reichart et al. |
| 2015/0323412 A1 | 11/2015 | Stoltz et al. |
| 2016/0097665 A1 | 4/2016 | Becerra et al. |
| 2016/0265208 A1 | 9/2016 | Brackett, Sr. et al. |
| 2016/0350880 A1 | 12/2016 | Tyner et al. |
| 2017/0212533 A1 | 7/2017 | Brody et al. |
| 2018/0216742 A1 | 8/2018 | Korten et al. |
| 2018/0230680 A1 | 8/2018 | Pieczynski, II et al. |
| 2019/0234786 A1 | 8/2019 | Klicpera |
| 2020/0363285 A1 | 11/2020 | Fung-A-Wing et al. |

* cited by examiner

SELF CHARGING FLUID FLOW SENSOR SYSTEM

TECHNICAL FIELD

The subject matter of this invention relates to fluid flow sensing and measurement systems, and more particularly to a self-charging Internet of Things (IoT) based system for sensing and measuring water flow and leaks in household appliances such as toilets and the like.

BACKGROUND

As water resources become more scarce and expensive, water management in large facilities such as apartments, hotels, etc., will continue to become more and more important. Among the challenges facility owners and managers face is to ensure that water waste and water damage is minimized.

One area where water waste is commonplace involves leaking water fixtures such as toilets. A simple slow leak may go undetected for some time as the toilet will continue to operate, but will repeatedly discharge water as though it was partially flushed. More involved leaks could result in an overflow situation causing significant flood damage to the water fixture and facility.

SUMMARY

Aspects of the disclosure provide a system that converts water flow energy into electrical power to recharge the system's battery. In one aspect, a self-charging sensor (SCS) is disclosed for sensing and measuring water flow and detecting leaks in commercial and residential water fixtures and appliances such as toilets.

In aspect, a self-charging sensor (SCS) is disclosed, having: a housing that includes: a rechargeable battery; a turbine module having a multi-wheel offset impeller adapted to be driven by a fill tube via an inlet port during an event, wherein a rotation of the turbine module generates electricity that recharges the rechargeable battery; and a processing module that collects count data associated with the rotation during the event; and an attachment component adapted to seat the housing on an overflow tube.

A further aspect provides a toilet, comprising: an overflow tube; a fill tube; and a self-charging sensor (SCS), having: a housing that includes: a rechargeable battery; a turbine module having a multilevel impeller having offset wheels that are adapted to be driven by a fluid flow from the fill tube via an inlet port during an event, wherein a rotation of the impeller causes the turbine module to generate electricity that recharges the rechargeable battery; and a processing module that collects count data associated with the rotation during the event; and an attachment component adapted to seat the housing on the overflow tube.

A further aspect provides self-charging sensor (SCS), having: a housing that includes: a rechargeable battery; a turbine module having an impeller adapted to be driven by a fluid flow via an inlet port during an event, wherein a rotation of the impeller causes the turbine module to generate electricity that recharges the rechargeable battery; and a processing module that collects count data associated with the rotation during the event; and an attachment component adapted to seat the housing on an overflow tube, wherein a center of gravity of the housing is substantially above a cross-sectional center point of the overflow tube when seated.

A further aspect discloses a unique turbine design capable of deriving sufficient energy from water flow at a wide range of speeds and pressures common in water fixtures for residential and commercial applications.

A further aspect discloses a water sensing probe capable of measuring water quality metrics related to water quality issues in water fixtures. Further, these probes can be configured to function directly using a printed circuit board.

A further aspect discloses an interface for attaching the SCS to the top of an overflow tube over the center of the opening. One or more adaptors are provided capable of attaching to a wide range of types, sizes and shapes.

A further aspect of the SCS allows for local control via a user push button.

A further aspect of the SCS is that it can be installed in an open configuration, i.e., a toilet, or a closed configuration, e.g., in line with a clothes washer, dishwasher, fire suppression or cooling system.

A further aspect of this design is that it can work for any fluid or consumable in the building, e.g., refrigeration and cooling system, electricity (AC or DC), heating oil or any petroleum product.

A further aspect of the device is the use of wireless communication that can be accomplished via traditional RF, Wi-Fi or Bluetooth techniques, plus newer technologies such as Long Range (LoRa) Wireless, Z-Wave and Zigby.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Aspects of this disclosure include a self-charging sensor (SCS) capable of, e.g., sensing and measuring water flow and detecting leaks in plumbing fixtures, piping and appliances (e.g., toilets, sinks, washing machines, etc.), particularly those using an overflow tube. In addition, a contained system converts water flow energy into electrical power to recharge the SCS.

In one embodiment, an SCS configured to fit into the tank of a toilet is disclosed. The SCS may be configured to perform various functions including, e.g., monitor water quality, collect and analyze water flow data, process data, and communicate wirelessly with a remote data processing system. Based on data collected and analyzed from one or more SCS's within a system of SCS's, various outputs can be generated, including, e.g., water flow data, pressure related data, leak detection data, alert data, water usage data, water quality data, etc.

Almost all conventional non-commercial toilets utilize water that is stored in a tank and released when flushed. After each flush, a re-fill "event" occurs within the toilet that includes a flow of water through a flexible fill tube and into an overflow tube. If there is a leak or other performance issue with the toilet (e.g., a malfunctioning flapper or fill valve), the toilet will flow more water than is necessary via the fill tube. The present invention provides a sensor system that, among other things, measures water flow between the flexible fill tube and overflow tube in a toilet. In one embodiment, the sensor system only activates when water is flowing through the fill tube, thus minimizing power usage of the system. Raw data corresponding to an amount of flow is captured by the system and wirelessly transmitted to a remote data processing system for analysis.

Figure 1:
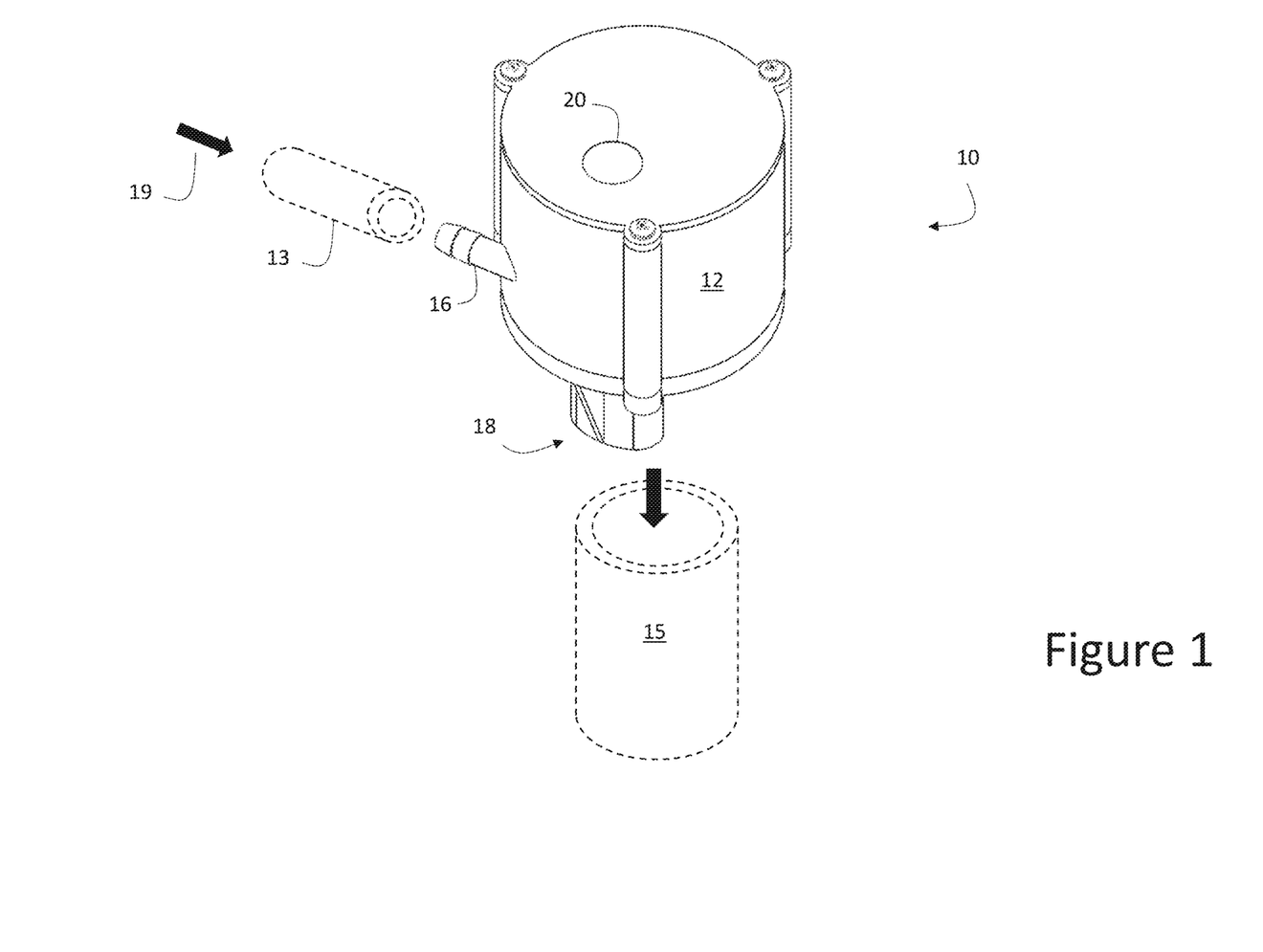
FIG. 1 shows an SCS according to embodiments.

An illustrative SCS 10 is shown in FIG. 1. SCS 10 generally includes a housing section 12, an inlet port 16 and an attachment component 18. Contained in the housing section 12 is a turbine module and processing module, which are described in further detail herein. A user interface 20 is provided on a top surface of the SCS 10, and may include a button, a visual output such as an LED, and LCD readout, an audio input/output, etc., and may be utilized as part of an I/O arrangement to facilitate configuration, setup, and maintenance of the SCS 10 via the processing module.

As shown, housing section 12 comprises a generally cylindrical shape that substantially distributes its weight evenly on the overflow tube when seated. Because of the cylindrical shape, the center of gravity of the housing 12, when seated, is substantially directly above the center of the overflow tube cross-section. Accordingly, during flush events and the like, SCS 10 remains more positionally stable (less likely to fall off) on the overflow tube 15 than other prior art arrangements in which the center of gravity is offset from the overflow tube 15.

Inlet port 16, which extends axially from housing 12, is configured to attached to a flexible fill tube 13 that receives a flow of water during event such as a toilet flush as shown by arrow 19. Once the water enters the housing, it spins a turbine and exits downward into the overflow tube 15. As described in further detail, the flow of water drives the turbine that in turn (1) collects flow data; and (2) creates electrical energy used to recharge a battery.

Figure 2:
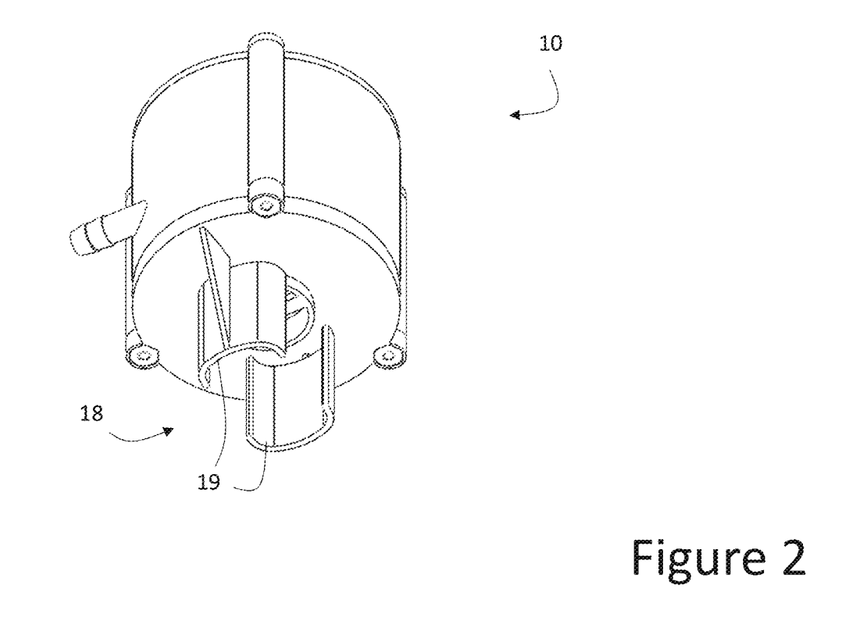
FIG. 2 shows a bottom isometric view of the SCS according to embodiments.

Attachment component 18 is configured to seat the housing 12 on top of the overflow tube 15 in the toilet. During a re-fill event, water enters into the inlet port 16, through the turbine, and exits downward though the attachment section 18 and into the overflow tube 15. In this illustrative embodiment, attachment component 18 is configured to fit around the top of traditional overflow tube 15, and may include a flexible and/or gripping surface to allow the SCS 10 to be seated firmly upon a traditional overflow tubes 15. A traditional overflow tube 15, such as that depicted in FIG. 1 generally includes a vertically oriented open cylinder made from plastic or the like. FIG. 2 depicts a bottom perspective view showing an illustrative attachment component 18 that include a pair of opposed fittings 19 that fit about an external surface of the overflow tube 15.

Figure 3:
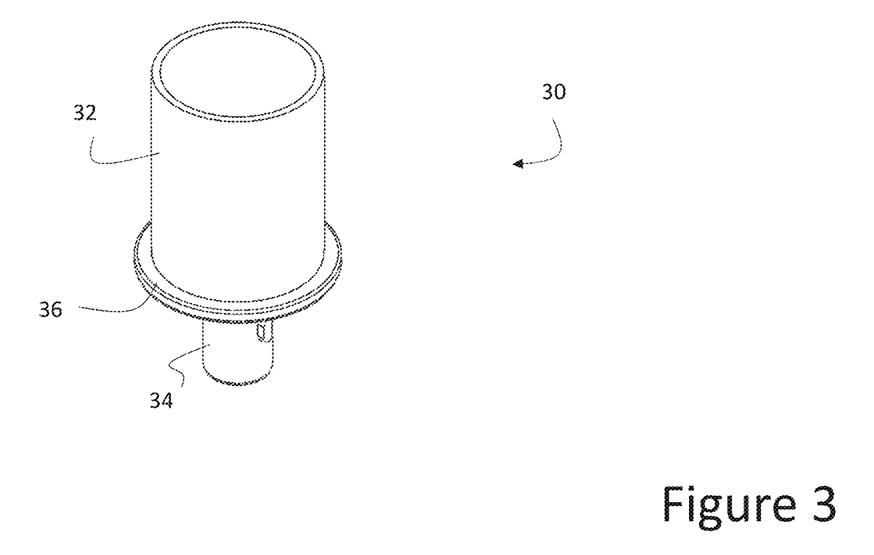
FIG. 3 shows a top isometric view of an adaptor for the SCS according to embodiments.

It is recognized that certain toilets (or other systems) may utilize an alternate overflow tube configuration, such as a Kohler-style flush valve assembly, also referred to as a "canister flush valve" assembly. To accommodate for different configurations, one or more adapters may be provided. An illustrative adapter 30 is shown in FIG. 3 for a Kohler valve assembly, and includes (1) a top section 32 that mates with the attachment component of the SCS 10, and (2) a mounting receptor 34/mounting plate 36 that mate with the top of the Kohler valve assembly. Kohler valve assemblies generally include a plunger tip or "tee-shaped stem" that extends upward. Mounting receptor 34 comprises an open ended, hollowed out cavity adapted to receive the tee-shaped stem, and may for example include notches, a gripping surface, a rubber insert, etc., that forms around and secures the tee-shaped stem therein.

Figure 4:
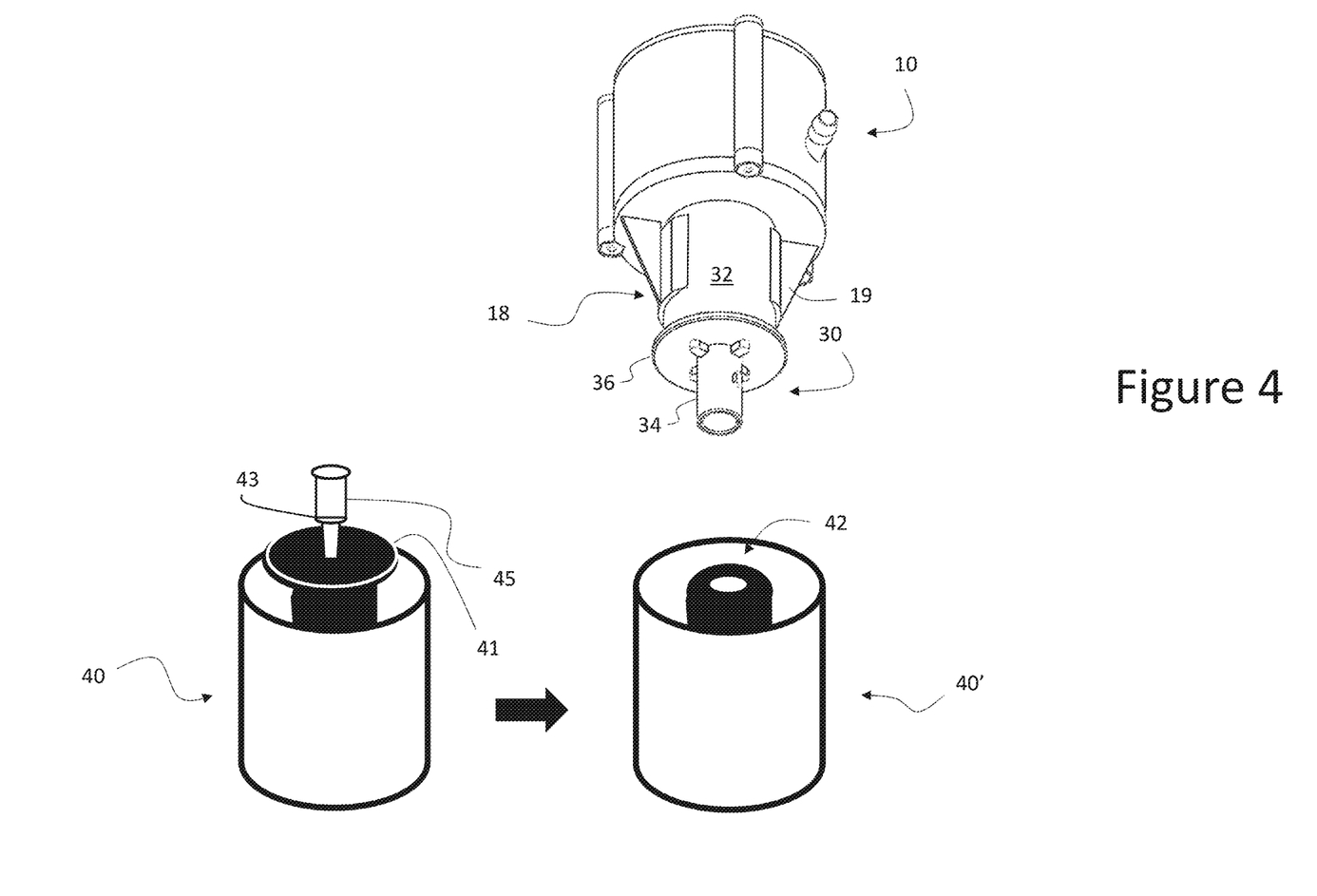
FIG. 4 show bottom isometric view of the SCS with the adaptor attached according to embodiments.

FIG. 4 depicts a bottom perspective view of SCS 10 with adaptor 30 attached thereto, and Kohler valve assembly 40, and a modified assembly 40'. As shown, the top section 32 of the adaptor 30 is seated within the attachment component 18 of the SCS 10. Kohler valve assembly 40 includes "stem" 45. The stem 45 is stepped 43 with different circumferences and extends up from a plate 41. As shown in modified assembly 40', parts 41, 43, and 45 of Kohler assembly 40 are removed when mounting SCS 10 thereon with adaptor 30. Once those parts are removed, mounting receptor 34 is configured to snap in place into open section 42 of the modified assembly 40'. It is understood that other configurations could likewise be employed to implement the mounting, e.g., the mounting receptor 34 could be shaped in substantially the exact form of the stem 45 and connect thereto. Further, it is understood that the any number or types of adaptors may be provided to interface with different styles of toilets and overflow tubes. The configurations shown here are not intended to be limiting on the scope of the patent.

Regardless of the type of overflow tube being used, the attachment component 18 and housing 12 may be configured such that a center of gravity of the housing 12 is substantially above a cross-sectional center point of the overflow tube when seated. This allows the turbine module 50 to substantially spin about the cross-sectional center point to provide a highly stable implementation. In depicted configurations, the housing 12 is substantially cylindrical in shape to allow its weight to evenly distributed over the top of the overflow tube. However, other shapes could be utilized.

Figure 5:
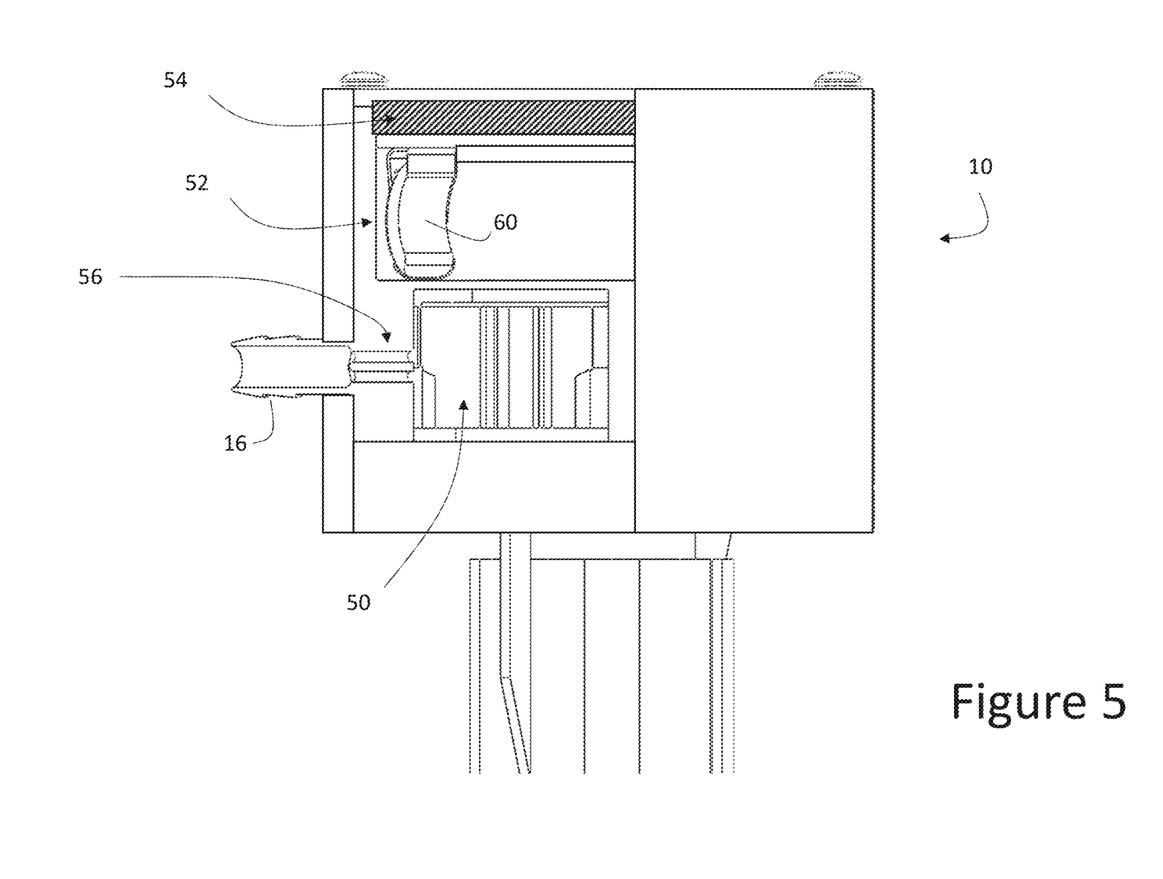
FIG. 5 shows a bottom partial cutaway view of the SCS according to embodiments.

FIG. 5 depicts a side partial cutaway view of SCS 10 that generally shows the turbine module 50, a battery housing 52 for receiving a battery 60, and a processing module 54. In this embodiment, inlet port 16 separates the inflow of water into a pair of (i.e., upper and lower) nozzles 56. As described in further detail herein, the turbine module 50 may include an offset impeller design that increases performance of the turbine module 50. The offset impeller includes multiple wheels configured to separately respond to the upper and lower nozzles 56.

Processing module 54 provides the onboard power and control services necessary to collect data and run the SCS 10. Processing module 54, which may include one or more circuit boards, provides, e.g., data processing services, wireless communication services, interface services, etc. Illustrative processing capabilities performed by processing module 54 and SCS 10 are described in U.S. Pat. No. 10,794,748, Fluid Flow Sensor System for Detecting Flow Events in a Toilet, issued on Oct. 6, 2020; US Publication 2019/0265092, Enhanced Fluid Flow Sensor System, published on Aug. 29, 2019; and US Publication 2020/0386598, Fluid Flow Probes and Analysis, published on Dec. 10, 2020, which are hereby incorporated by reference.

In certain embodiments, count data is collected by the processing module 54 for each rotation of the turbine impeller over a period of time. For example, when a triggering event (e.g., a flush, a leak, etc.) occurs, a count value is collected for every two second interval during the event. This series of count data is stored by the processing module 54 and may be periodically transmitted to a remote processing system to analyze the data. The initial rotation of the impeller may trigger the beginning of a detected event, which may continue until the rotation stops, or for some predetermined period of time.

Figure 6:
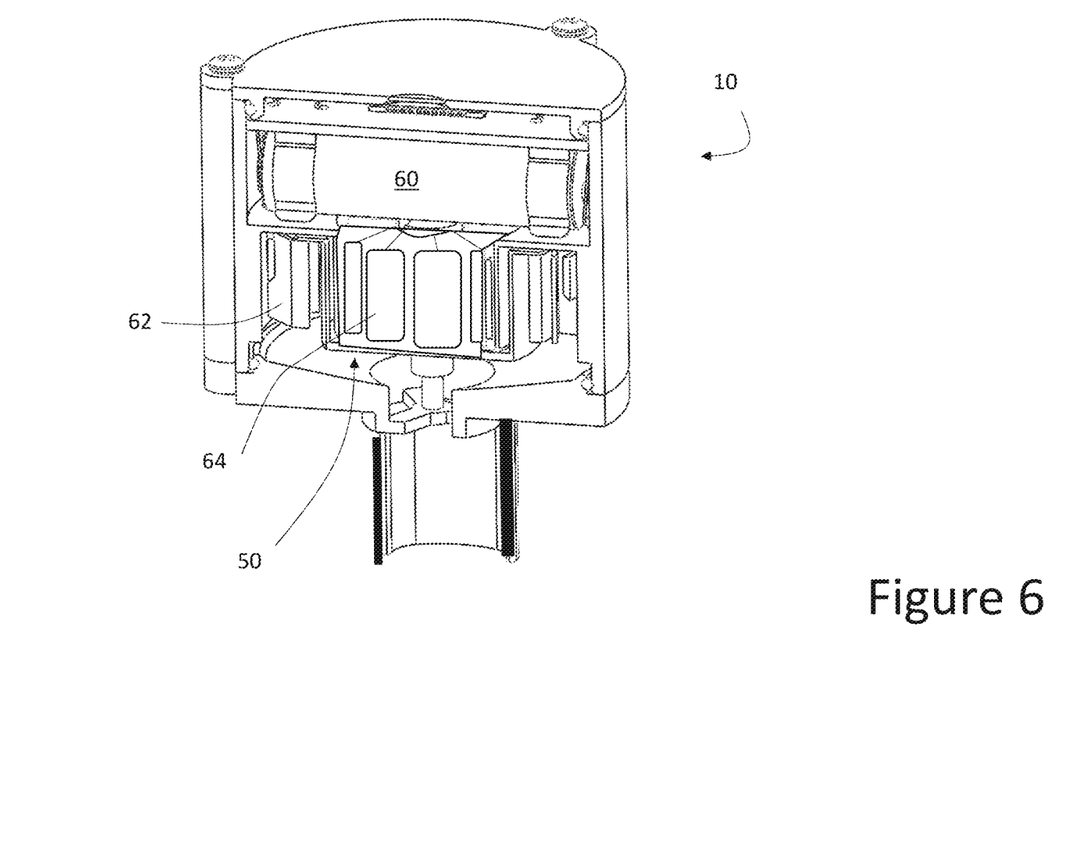
FIG. 6 shows a further cutaway view of the SCS according to embodiments.

FIG. 6 shows a further cutaway view of SCS 10, which depicts battery 60 and details of the turbine module 50. Turbine module 50 includes a turbine 62 that rotates rotor elements (i.e., a magnet or set of magnets) about a stator to create electromagnetic energy in the form of electricity that is used to recharge battery 60. Rechargeable battery 60 (e.g., a lithium ion battery, ultra-capacitor, etc.) powers the SCS 10. The battery 60 is recharged using electrical energy generated by the turbine module 50, which utilizes a turbine to generate electricity from water flow. In the illustrative embodiment, SCS 10 is configured to intercept a flow of water via inlet port 16 from a fill tube 13 in a toilet to drive the turbine and generate electricity.

Figure 7:
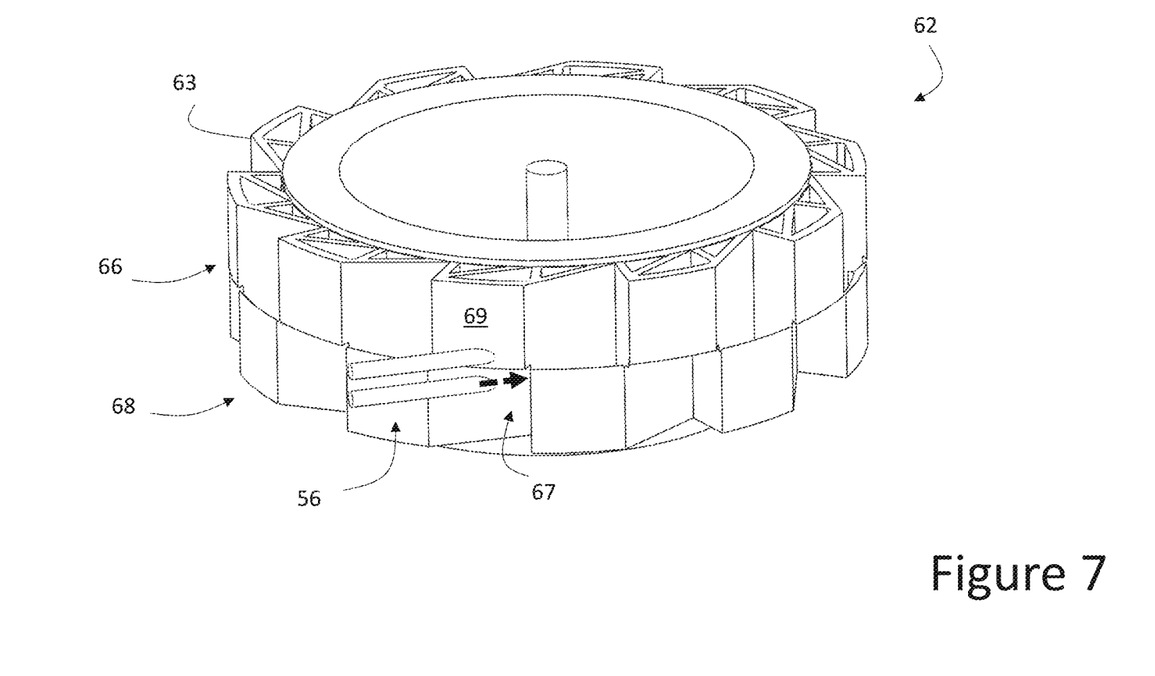
FIG. 7 shows a multi-wheel impeller according to embodiments.

FIG. 7 depicts an illustrative multilevel impeller 62 having offset wheels, in this case, two integrated wheels, wheel 66 and wheel 68. The wheels 66, 68 have angled teeth (or buckets) 63 and are offset with respect to each other, such that the water exiting the two nozzles 56 are alternatively blocked or strike an impact face of respective offset teeth on the two wheels 66, 68. In the position shown, the top nozzle is blocked by the exterior surface 69 of a tooth on the upper wheel 66, while water from the lower nozzle strikes a tooth surface of the lower wheel 68, as shown by arrows 67 (generating pressure only to the lower wheel 68).

As the turbine rotates moving both wheels 66, water will next exit the top nozzle and drive a tooth face of the top wheel 66 while water from the lower nozzle will be blocked by the exterior surface of the lower wheel 68. Using a multilevel impeller 62 such as this increases the transfer of energy from the water flow to the wheel rotation, thus increasing electrical output. It is understood that a multilevel wheel may employ two or more wheels.

In some embodiments, the teeth of the wheels may be hollow to reduce weight. In other illustrative embodiments, the cross-section of nozzles 56 may comprise a vertically oriented oval (i.e., elliptical) shaped to disperse the water in a vertical manner, increasing the water distributing to the multilevel turbine wheel 62.

Figure 8:
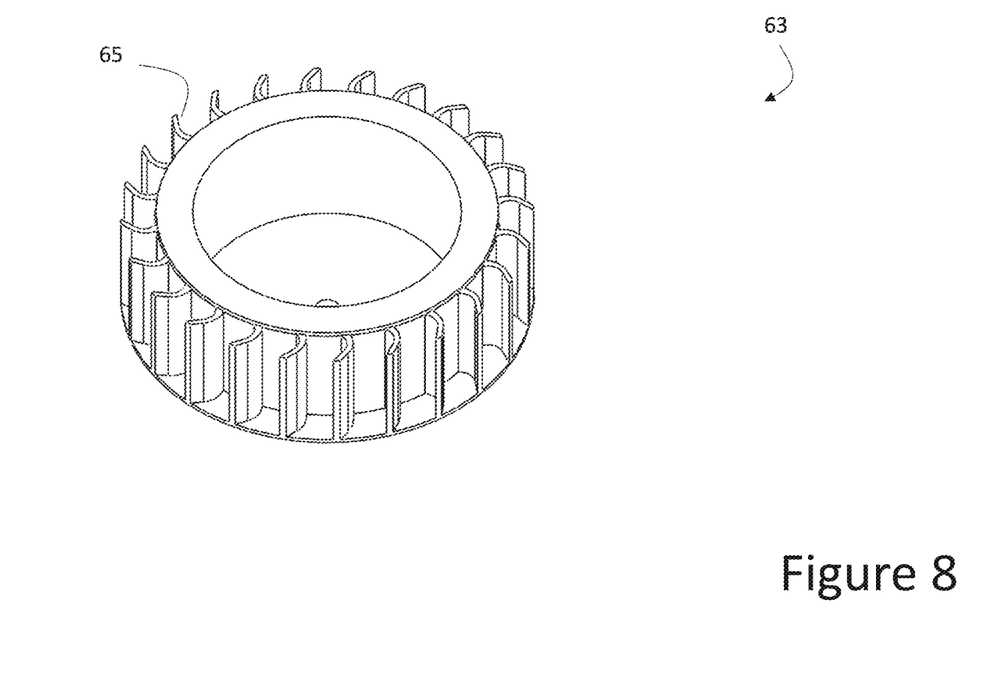
FIG. 8 shows an alternative impeller design according to embodiments.

Each impeller wheel 66, 68 may be implemented with shaped teeth to maximize efficiency. For example, the turbine wheel may have straight faces perpendicular to the water flow or may have more complex shapes, e.g., singly-curved or doubly-curved profiles, such as impeller wheel 63 shown in FIG. 8 having curved teeth 65.

The multilayer impeller 62 significantly increases capture efficiency, reduces axial loading thereby enhancing life of unit, reduces jet shearing and enhances energy conversion, and provides free draining that minimizes windage losses. The number of buckets (i.e., teeth) may vary depending on the diameter of the rotor. For the geometry depicted in FIG. 7, the selected number of buckets is 10, and the two layers allows for 20 buckets total. Top and bottom wheels are offset so that water flow is never completely turned off, and the offset can be tuned to optimize for the size, shape and speed of the incoming water jet through nozzles 56.

In certain embodiments, a probe located anywhere along the water flow within SCS 10 may be utilized to monitor parameters of the water itself, such as quality, characteristics, temperature, etc. Further, the probe may be utilized to activate or deactivate system services, e.g., probes may be configured to detect water flow while the processing module is in a sleep mode using very little power, and then wake the processing module to perform some action. Probes may include a sensing element implemented on a printed circuit board (pcb), e.g., fastened to the bottom side of the turbine module 50, and e.g., utilize parallel strips of gold-plated copper a finite distance apart to sense.

Figure 9:
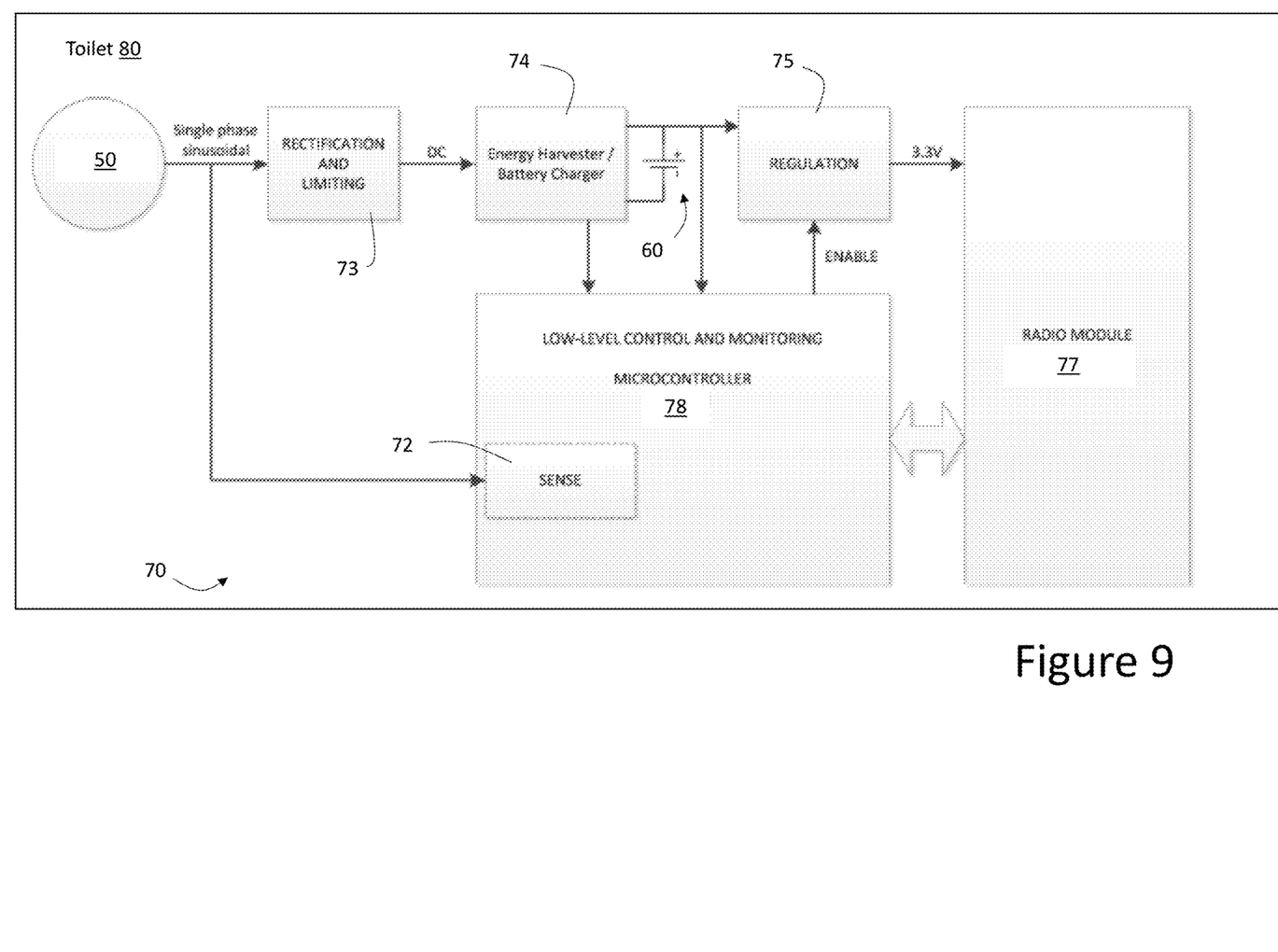
FIG. 9 depicts a system diagram according to embodiments.

FIG. 9 depicts an illustrative system diagram 70 for SCS 10 implemented in a toilet 80. As shown, during an event, such as a flush or leak, generator (i.e., turbine module) 50 outputs a single phase sinusoidal signal that on the upper path is processed by a rectifying and limiting module 73, which converts the alternating signal into a DC signal. The DC signal is fed into an energy harvester/battery charger 74 that charges the battery 60. The battery 60 is used to power the microcontroller 78 directly and also powers radio module 77 via a regulation module 75 (i.e., to provide, e.g., 3.3V). Microcontroller 78 also receives an input from the energy harvester/battery charger 74 to monitor the battery charging process. Power to the regulation module 75/radio module 77 are also controlled by the microcontroller 78 via an enable signal. As the radio module 77 requires significantly more power to operate, it is left unpowered until a communication is initiated by the microcontroller 78.

Sinusoidal output from the generator 50 is also fed to a sense module 72 in the microcontroller 78. Sense module 72 counts cycles of the sinusoidal signal during the event. As noted, in some embodiments, count values are collected for a sequence of time intervals, e.g., two second time intervals, during an event. The event data can be analyzed by the microcontroller 78 or a remote processing system via radio module 77 to detect leaks, analyze performance, evaluate pressure, etc.

It is understood that components of an overall system may be implemented as a computer program product stored on a computer readable storage medium.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing systems utilized herein may comprise any type of computing device and for example includes at least one processor, memory, an input/output (I/O) (e.g., one or more I/O interfaces and/or devices), and a communications pathway. In general, processor(s) execute program code which is at least partially fixed in memory. While executing program code, processor(s) can process data, which can result in reading and/or writing transformed data from/to memory and/or I/O for further processing. The pathway provides a communications link between each of the components in computing system. I/O 64 can comprise one or more human I/O devices, which enable a user to interact with computing system. Computing system may also be implemented in a distributed manner such that different components reside in different physical locations.

Furthermore, it is understood that a data processing system or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A self-charging sensor (SCS), having:
   a housing that includes:
      a rechargeable battery;
      a turbine module having a multilevel impeller having offset wheels that are adapted to be driven by a fluid flow via an inlet port during an event, wherein a rotation of the impeller causes the turbine module to generate electricity that recharges the rechargeable battery; and
      a processing module that collects count data associated with the rotation during the event; and
   an attachment component adapted to seat the housing on an overflow tube;
   wherein the inlet port includes a first nozzle adapted to direct a flow of fluid to a first wheel of the impeller and a second nozzle adapted to direct a flow of fluid to second wheel of the impeller.

2. The SCS of claim 1, wherein each wheel of the impeller includes an outer surface that alternatively block the flow of fluid from the first and second nozzle as the impeller rotates.

3. The SCS of claim 2, wherein the first and second nozzle have an elliptically shaped profile.

4. The SCS of claim 1, wherein the housing includes a cylindrical shape that substantially distributes its weight evenly on the overflow tube when seated.

5. The SCS of claim 4, wherein the attachment component is configured to be seated on a traditional overflow tube that comprises an open-ended vertically oriented pipe.

6. The SCS of claim 5, further comprising an adaptor configured to connect to the attachment component on a first end and further configured to connect to a canister flush valve on a second end.

7. The SCS of claim 1, wherein the processing module converts a sinusoidal signal from the turbine module into a direct current signal to charge the rechargeable battery.

8. The SCS of claim 7, wherein the processing module utilizes the sinusoidal signal to capture count data.

9. The SCS of claim 1, where each wheel includes teeth that are curved.

10. A toilet, comprising:
    an overflow tube;
    a fill tube; and
    a self-charging sensor (SCS), having:
       a housing that includes:
          a rechargeable battery;
          a turbine module having a multilevel impeller having offset wheels that are adapted to be driven by a fluid flow from the fill tube via an inlet port during an event, wherein a rotation of the impeller causes the turbine module to generate electricity that recharges the rechargeable battery; and
          a processing module that collects count data associated with the rotation during the event; and
       an attachment component adapted to seat the housing on the overflow tube;
       wherein the inlet port includes a first nozzle adapted to direct a flow of fluid to a first wheel of the impeller and a second nozzle adapted to direct a flow of fluid to second wheel of the impeller.

11. The toilet of claim 10, wherein each wheel of the impeller includes an outer surface that alternatively block the flow of fluid from the first and second nozzle as the impeller rotates.

12. The toilet of claim 10, wherein the housing includes a cylindrical shape that substantially distributes its weight evenly on the overflow tube when seated.

13. The toilet of claim 10, wherein the processing module converts a sinusoidal signal from the turbine module into a direct current signal to charge the rechargeable battery.

14. The toilet of claim 13, wherein the processing module utilizes the sinusoidal signal to capture count data.

15. A self-charging sensor (SCS), having:
    a housing that includes:
       a rechargeable battery;
       a turbine module having a multilevel impeller having offset wheels that are integrated together and spin about a common axis and are adapted to be driven by a fluid flow via an inlet port during an event, wherein a rotation of the impeller causes the turbine module to generate electricity that recharges the rechargeable battery; and
       a processing module that collects count data associated with the rotation during the event; and
       an attachment component adapted to seat the housing on an overflow tube, wherein a center of gravity of the housing is substantially above a cross-sectional center point of the overflow tube when seated.

16. The SCS of claim 15, wherein the housing has a substantially cylindrical shape.

17. The SCS of claim 15, wherein the impeller substantially rotates about the cross-sectional center point of the overflow tube when seated.

18. The SCS of claim 15, wherein the impeller comprises offset wheels that are adapted to be alternatively driven by a fluid flow from a set of nozzles formed by the inlet port.

* * * * *